United States Patent
Chou

(10) Patent No.: US 7,199,188 B2
(45) Date of Patent: Apr. 3, 2007

(54) TOUGHENED THERMOPLASTIC POLYAMIDE COMPOSITIONS

(75) Inventor: Richard T. Chou, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/510,808

(22) PCT Filed: May 23, 2003

(86) PCT No.: PCT/US03/16353

§ 371 (c)(1),
(2), (4) Date: Oct. 6, 2004

(87) PCT Pub. No.: WO03/099930

PCT Pub. Date: Dec. 4, 2003

(65) Prior Publication Data

US 2005/0239964 A1    Oct. 27, 2005

(51) Int. Cl.
*C08F 8/30* (2006.01)
(52) U.S. Cl. .................... 525/179; 428/474.4; 525/66; 525/183
(58) Field of Classification Search ................ 525/179, 525/183, 66; 428/474.4
See application file for complete search history.

(56) References Cited

U.S. PATENT DOCUMENTS

| | | | |
|---|---|---|---|
| 3,388,186 A | 6/1968 | Kray et al. | |
| 3,466,059 A | 9/1969 | Seven et al. | |
| 3,668,274 A | 6/1972 | Owens et al. | |
| 3,845,163 A | 10/1974 | Murch | |
| 4,174,358 A | 11/1979 | Epstein | |
| RE30,322 E | 7/1980 | Hammer et al. | |
| 5,114,658 A | 5/1992 | Katsaros | |
| 5,179,164 A * | 1/1993 | Lausberg et al. | ........... 525/179 |
| 5,346,963 A | 9/1994 | Hughes et al. | |
| 5,408,000 A | 4/1995 | Katsaros et al. | |
| 5,859,137 A | 1/1999 | Chou | |
| 6,008,297 A * | 12/1999 | Tanaka et al. | ............... 525/178 |
| 6,759,480 B1 * | 7/2004 | Bouilloux et al. | ............ 525/60 |

OTHER PUBLICATIONS

Ann T. Thayer, "Metallocene Catalysts Initiate New Era in Polymer Synthesis", Chemical and Engineering News, Sep. 11, 1995, pp. 15-20.

Laird et al, "A perspective on some recent developments in metallocene catalysts", Rubber World, Oct. 1997, pp. 42-86.

* cited by examiner

*Primary Examiner*—Ana Woodward

(57) ABSTRACT

The present invention is a composition useful as an impact modifier for polyamide compositions. In one embodiment, impact modifiers of the present invention are ethylene maleic anhydride copolymers having at least 3% maleic anhydride functionality.

15 Claims, No Drawings

TOUGHENED THERMOPLASTIC POLYAMIDE COMPOSITIONS

BACKGROUND OF THE INVENTION

1. Field of the Invention

This invention relates to polyamide compositions, and to a process of preparing same.

2. Description of the Related Art

Thermoplastic resins used as plastics in engineering applications can require additives to modify, that is, increase the impact resistance of said thermoplastic resins. U.S. Pat. No. 3,845,163 discloses blends of 60 to 85 weight percent polyamide and an acid-containing olefin polymer. U.S. Pat. No. 3,388,186 discloses a polyamide composition that includes an ethylene-containing grafted copolymer. U.S. Pat. No. 3,465,059 similarly discloses a polyamide composition that includes an ethylene-containing grafted copolymer. U.S. Pat. No. 3,668,274 discloses polycarbonamides that have been modified with an elastomeric phase and a rigid phase thermoplastic stage containing amine-reactive moieties.

Maleic anhydride grafted polyolefins (maleated polyolefins) and ethylene copolymers are widely used as impact modifiers for engineering polymers, particularly for polyamide polymer resins. Maleated polyolefins can be the preferred modifiers for use with polyamide resins. U.S. Pat. No. 4,174,358 discloses copolymers of ethylene/maleic anhydride as tougheners for polyamides having a number average molecular weight of at least 5000. U.S. Pat. No. 5,346,963 describes the use of maleic anhydride-grafted substantially linear ethylene polymers and blends thereof with olefin polymers and also with non-olefin polymers such as polyamides. U.S. Pat. No. 6,008,297 describes polyamide compositions that include acid-grafted ethylene/alpha-olefin copolymers for improved low-temperature impact strength.

The use of maleated polyolefins is not trouble-free, however. There are limitations with using maleated polyolefins as impact modifiers. For example, it can be difficult to reach a high level of grafting in a maleated polyolefin. Grafting, as conventionally practiced, involves the use of a free-radical initiator. To achieve higher levels of grafting, which can be desirable, it can be necessary to include the free-radical initiator in a higher concentration. Using the initiator at higher concentrations can cause undesirable side reactions, such as crosslinking and chain scission. For this reason, grafting of maleic anhydride at a concentration of greater than 2 wt % can be difficult and troublesome. In addition, controlling the quality and consistency of maleated polyolefins—particularly those having higher concentrations of maleic anhydride grafting—can be troublesome. By-products, unreacted monomers, and crosslinking can significantly detract from the quality of maleated polyolefins at any grafting level, but this can be more of a problem particularly as the grafting level increases. Further, the cost of producing maleated polyolefins with high maleic graft levels can be substantial.

Ethylene copolymers that include reactive functional groups such as maleic anhydride can be readily obtained by a high-pressure free radical process. However, these copolymers generally are not good impact modifiers for polyamide polymer resins.

It would be desirable to prepare an impact modifier for polyamide polymer resins that are effective tougheners for polyamide resins and do not have the problems associated with high levels of grafting in maleated polyolefins.

SUMMARY OF THE INVENTION

In one aspect, the present invention is a toughened polyamide composition, comprising (1) from about 50 to about 98 wt % of a polyamide polymer resin, and (2) from about 2 to about 50 wt % of an impact modifier composition comprising (a) from about 10 to about 50 wt % of a copolymer prepared from ethylene, a functional comonomer and optionally a third comonomer, wherein the functional comonomer is included in the range of from about 3 to about 15 wt % in the copolymer; and (b) from about 50 to about 90 wt % of an ethylene-based polymer.

DETAILED DESCRIPTION OF THE INVENTION

In one embodiment, the present invention is a composition useful as an impact modifier for polyamide polymer compositions. The composition comprises as one component a maleated polyolefin which is a copolymer of ethylene and maleic anhydride, or its functional equivalent. Such equivalents include derivatives of maleic anhydride such as maleic acid and/or salts thereof, maleic acid diesters, maleic acid monoesters, itaconic acid, fumaric acid, fumaric acid monoester, or mixtures of any of these. Maleated polyolefins also include E/X/Y terpolymers, wherein: E is ethylene; X is a monomer selected from the group consisting of vinyl acetate, (meth)acrylic acid, and/or derivatives thereof; and Y is maleic anhydride or its functional equivalent. Examples of monomers suitable for inclusion as component X are: (Meth)acrylic acid derivatives include acids, salts, esters, anhydrides, or other acid derivatives that are known to one of ordinary skill in the chemical arts. Methyl acrylate and butyl acrylate are also examples of acrylate monomers suitable for inclusion as component X. Suitable as Y components are: Maleic diesters or monoesters (maleic halfesters) include esters of C1–C4 alcohols, such as, for example, methyl, ethyl, n-propyl, isopropyl, and n-butyl alcohols. Preferably the maleated polyolefin includes maleic anhydride, maleic acid diesters, and/or maleic acid halfesters. More preferably the maleated polyolefin includes maleic anhydride and/or maleic acid half-esters.

Maleated polyolefins useful herein are obtained by a high pressure free radical polymerization process. A high pressure process suitable for use in the practice of the present invention is described, for example, in U.S. Pat. No. 4,351,931.

The modifier composition comprises as a second component an ethylene-based polymer (base resin). The base resin can be: high density polyethylenes (HDPE); low density polyethylenes (LDPE); linear low density polyethylenes (LLDPE); ultra low density polyethylenes (ULDPE); copolymers of ethylene and alpha-olefin monomer using a metallocene catalyst (metallocene polyethylenes, or MPE); ethylene/propylene copolymers; or terpolymers such as ethylene/propylene/diene monomer (EPDM).

Suitable base resins can include ethylene copolymers obtained from copolymerization of ethylene with a polar monomer. Such suitable copolymers include: ethylene acrylate copolymers and ethylene vinyl acetate copolymers, including ethylene acrylic acid copolymers, ethylene methacrylic acid copolymers, salts derivable from ethylene acrylic and/or methacrylic acid copolymers, ethylene acrylic ester copolymers, ethylene methacrylic ester copolymers, and/or mixtures of any of these.

Preferably, the base resin is a soft polymer. More preferably, the base resin is MPE, LLDPE, and ethylene copolymers of ethylene and acrylate. Most preferably, the base resin is selected from either MPE or ethylene copolymers of ethylene and acrylate. In a particularly preferred embodiment, where ethylene copolymers are included, the ethylene copolymer is of the type that is prepared in a tubular reactor, according to the procedure described in the article "High Flexibility EMA Made from High Pressure Tubular Process" (Annual Technical Conference—Society of Plastics Engineers (2002), 60th (Vol. 2), 1832–1836).

Without being held to theory, MPE can be preferred in the practice of the present invention because of its substantially linear structure and narrow molecular weight distribution of MPE. MPE technology is capable of making lower density MPE with high flexibility and low crystallinity, which can be desirable as the second component of this invention.

MPE technology is described in, for example, U.S. Pat. No. 5,272,236; U.S. Pat. No. 5,278,272, U.S. Pat. No. 5,507,475, U.S. Pat. No. 5,264,405, and U.S. Pat. No. 5,240,894.

The modifier composition can include from about 10 to about 50 wt %, based on the total weight of the modifier composition, of the ethylene maleic anhydride copolymer, or its functional equivalent. Preferably, the modifier includes from about 10 to about 45 wt % of the maleated polyolefin, more preferably the composition includes from about 15 to about 40 wt % of the maleated polyolefin, and most preferably from about 20 to about 35 wt % of the maleated polyolefin.

The modifier can include from about 50 to about 90 wt % of the ethylene-based polymer, based on the total weight of the modifier composition. Preferably the modifier includes from about 55 to about 90 wt %, more preferably from about 60 to about 85 wt %, and most preferably from about 70 to about 85 wt % of the ethylene-based polymer.

A modifier composition of the present invention is particularly useful for improving the impact resistance of polyamide compositions that include the modifier compositions of the present invention. Without being held to theory, it is believed that the anhydride functionality aids in dispersing the polymer modifier in the polymer matrix. In addition, it is believed that the anhydride functionality assists in enhancing the interfacial adhesion between the modifier and the polymer matrix. Modifier compositions of the present invention can include a higher concentration of grafted anhydride functionality, which can enhance the effectiveness of the modifier composition as a polyamide toughener, without detracting from the other desirable characteristics of the modified polyamide composition.

In another embodiment, the present invention is a polyamide composition comprising the modifier of this invention. The polyamide can be any that is commercially available, such as for example nylon 6, nylon 66, nylon 612, nylon 11 or nylon 12. Various nylon grades can be purchased commercially from E.I. DuPont de Nemours & Company. Alternatively, methods for preparing polyamides suitable for use in the present invention are known and conventional. For example, suitable polyamides can be prepared according to methods described in U.S. Pat. Nos. 2,071,250; U.S. Pat. Nos. 2,130,523; U.S. Pat. Nos. 3,393,210. The polyamide compositions of the present invention can include from about 50 to about 98 wt %, based on the weight of the total polyamide composition, of polyamide. Preferably the polyamide composition includes from about 60 to about 98 wt % polyamide, more preferably from about 70 to about 98 wt % polyamide, most preferably from about 80 to about 98 wt % polyamide.

The modifier is included in the polyamide composition in the range of from about 2 to about 50 wt % of the total polyamide composition. Preferably the modifier is included in an amount of from about 2 to about 40 wt %, more preferably from about 2 to about 30 wt %, and most preferably from about 2 to about 20 wt % of the total polyamide.

The modifier composition and/or the polyamide composition can include optional components, so long as they do not interfere with the basic and novel characteristics of the polyamide composition of the present invention. For example, components that interfere with the interfacial adhesion between the modifier and the polyamide polymer matrix, or detract from the strength or quality of the polyamide polymer composition, or add substantial costs to the manufacture of the presently claimed polyamide composition, or are otherwise deleterious to the toughness or impact resistance of the polyamide composition are considered to interfere with some of the basic characteristics of the presently claimed invention. Other characteristics that were not exemplified above may nonetheless still be considered basic and/or novel to the presently claimed invention. For example, color, smell, appearance, feel, safety in handling or using, are considered basic characteristics of the present invention. Any added component that interferes with these characteristics, whether mentioned above or not, can be excluded from the composition claimed herein. Any optional components, whether or not contemplated herein, that negatively effect the basic novelty of the present invention can be excluded from the claimed invention.

EXAMPLES

The following examples are illustrations of the present invention, and not intended to limit the scope of the present invention in any way.

EXAMPLES

Preparing Blends

The Examples samples in table I and table II were prepared by melt blending using a twin screw extruder with a mixing screw, using a melt temperature of between 280–300 C for the samples in table I, and using a melt temperature of between 260–280 C for the samples listed in Table II.

Test Procedures

Melt flow index (MI) is measured using ASTM D-1238 using a 2160 gram weight, and measured at 190 C.

Izod impact was measured using ASTM D-256 using injection molded specimens. The molded bars were 5 inches long, ½ inch wide and ⅛ inch thick. The bars were cut in half and notches made 1¼ inches from the gate (near gate, listed in table as gate) and 3¾ inches from the gate (far from gate, listed in the table as far) because of possible orientation during molding, the impact results can be different from the two locations, as can be seen from the data in Table 1 and table 2.

Tensile strength was measured using ASTM D-638 using injection molded bars.

Materials used in Table 1

Nylon 66 employed is a commercial nylon 66, Zytel 101, available from Du Pont Co.

MPE employed s a commercial Engage 8100 with a density of 0.87 g/cc and a melt flow index of 1.0, available from DuPont Dow Co.

EMA employed is a commercial copolymer of ethylene and methyl acrylate with 24 weight percent of methyl acrylate and a melt flow index of 2.0, available from Du Pont Co.

E/MAME(a) and E/MAME(b) are copolymers of ethylene and ethyl hydrogen maleate(MAME), prepared in a pilot plant unit. E/MAME(a) contains about 6 weight percent of MAME with a melt flow index of 30; E/MAME(b) contains about 8 weight percent of MAME with a melt flow index of 30.

E/MAA/MAME is a terpolymer of ethylene, methacrylic acid (11 weight percent) and ethyl hydrogen maleate(6 weight percent) with a melt flow index of 90, prepared in a pilot plant unit.

Materials used in Table II

The nylon 6 samples employed are Ultramide B3 and Ultramide B35, both available from BASF. LLDPE employed is a commercial resin with a density of 0.91 g/cc and a melt flow index of 1.0, available from Exxon Co. MPE, and both E/MAME(a) and E/MAME(b) are described above.

TABLE I

Toughened Nylon 66

| | Modifier | | Notched Izod Impact | | | Tensile |
| | Ethylene Copolymer (wt. %) | Functional Copolymer (wt. %) | R. T. (ft-lbs) (gate/far) | 0° C. (ft-lbs) (gate/far) | −20° C. (ft-lbs) (gate/far) | Strength R.T.(kpsi) |
|---|---|---|---|---|---|---|
| C1 | control | | 0.8<br>0.8 | | | 8.6 |
| C2 | MPE (20%) | | 0.8<br>0.8 | 0.7<br>0.6 | 0.6<br>0.4 | 7.4 |
| Ex. 1 | MPE (15%) | E/MAME(a) (5%) | 14.7<br>18 | 2.9<br>10 | 2.1<br>2.6 | |
| Ex. 2 | MPE (15%) | E/MAA/MAME (5%) | 3.3<br>15.3 | 1.9<br>2 | 1.6<br>1.4 | 7.9 |
| Ex. 3 | MPE (15%) | E/MAME(b) (5%) | 17.2<br>21.2 | 13.7<br>16.8 | 4.4<br>5.6 | |
| C3 | EMA (20%) | | 1.63<br>3.2 | 1.2<br>1.7 | 0.8<br>0.9 | |
| Ex. 4 | EMA (15%) | E/MAA/MAME (5%) | 14<br>19.1 | 3.6<br>5.6 | 2.4<br>2.2 | |
| Ex. 5 | EMA (15%) | E/MAME(b) (5%) | 7<br>16.2 | 3.2<br>4.8 | 2<br>1.9 | |

TABLE II

Toughened Nylon 6

| | | Modifier | | Notched Izod Impact | | | Tensile |
| | Nylon 6 | Ethylene Copolymer (wt. %) | Functional Copolymer (wt. %) | R. T. (ft-lbs) (gate/far) | 0° C. (ft-lbs) (gate/far) | −20° C. (ft-lbs) (gate/far) | Strength R.T.(kpsi) |
|---|---|---|---|---|---|---|---|
| C4 | Ultramide B35 | control | | 0.9<br>0.9 | 1<br>0.9 | 0.9<br>0.7 | 9.3 |
| C5 | Ultramide B35 | MPE (20%) | | 1.6<br>1.5 | 1<br>0.9 | 0.9<br>0.7 | 6.7 |
| Ex. 6 | Ultramide B35 | MPE (15%) | E/MAA/MAME (5%) | 18.3<br>12.7 | 11.3<br>4.4 | 3<br>3 | 8.3 |
| Ex. 7 | Ultramide B35 | MPE (15%) | E/MAME(b) (5%) | 26.8<br>22.5 | 20.7<br>21.9 | 7.9<br>8.3 | |
| Ex. 8 | Ultramide B35 | MPE (17.5%) | E/MAME(b) (2.5%) | 24.8<br>21.3 | 21.4<br>20 | 5.5<br>5 | |
| Ex. 9 | Ultramide B3 | MPE (15%) | E/MAME(b) (5%) | 7.7<br>11.8 | 2.9<br>9.1 | 1.9<br>2.4 | |
| Ex. 10 | Ultramide B3 | MPE (15%) | E/MAME(a) (5%) | 11.9<br>14.3 | 9.59<br>13.4 | 3.5<br>3.3 | |
| C6 | Ultramide B35 | EMA (20%) | | 2.6<br>2.7 | 1.7<br>1.5 | 0.9<br>0.9 | |
| Ex. 11 | Ultramide B35 | EMA (15%) | E/MAME(a) (5%) | 14<br>14.7 | 7.6<br>5 | 2.5<br>2.4 | |
| Ex. 12 | Ultramide B35 | EMA (15%) | E/MAME(b) (5%) | 19.3<br>13 | 12.7<br>7.3 | 2.6<br>2.4 | |
| Ex. 13 | Ultramide B35 | EMA (17.5%) | E/MAME(b) (2.5%) | 14.2<br>10.9 | 3.7<br>3.2 | 2.3<br>2.3 | |

TABLE II-continued

Toughened Nylon 6

| | | Modifier | | Notched Izod Impact | | | Tensile |
| --- | --- | --- | --- | --- | --- | --- | --- |
| | | Ethylene Copolymer (wt. %) | Functional Copolymer (wt. %) | R. T. (ft-lbs) (gate/far) | 0° C. (ft-lbs) (gate/far) | −20° C. (ft-lbs) (gate/far) | Strength R.T.(kpsi) |
| Ex. 14 | Ultramide B3 | EMA (15%) | E/MAA/MAME (5%) | 4.8 7.7 | 3.5 3.1 | NA NA | |
| Ex. 15 | Ultramide B3 | EMA (15%) | E/MAME(b) (5%) | 8.5 9.4 | 3.1 3.3 | NA NA | |
| Ex. 16 | Ultramide B3 | LLDPE (15%) | E/MAME(a) (5%) | 3.5 9.2 | 3.5 3.8 | 2.9 2.8 | |

What is claimed is:

1. A toughened polyamide composition, comprising: (1) from about 50 wt % to about 98 wt % of a polyamide resin, based on the total weight of the polyamide composition, and (2) from about 2 wt % to about 50 wt % of an impact modifier composition, based on the total weight of the polyamide composition, said impact modifier composition comprising (a) from about 10 wt % to about 50 wt % of a first polymer, based on the total weight of said impact modifier composition, wherein said first polymer is a copolymer prepared by high pressure free radical copolymerization comprising copolymerized units of ethylene and a comonomer selected from the group consisting of maleic acid monoesters, maleic acid diesters, fumaric acid monoesters, and mixtures thereof, and wherein said first polymer comprises from about 3 wt % to about 15 wt % of said comonomer, and (b) from about 50 wt % to about 90 wt % of a second polymer, based on the total weight of said impact modifier composition, wherein said second polymer is a copolymer of ethylene and an alpha-olefins prepared using metallocene catalysts.

2. The polyamide composition of claim 1 wherein the impact modifier is included in an amount of from about 5 wt % to about 45 wt %, based on the total weight of the polyamide composition.

3. The polyamide composition of claim 2 wherein the impact modifier is included in an amount of from about 5 wt % to about 30 wt %, based on the total weight of the polyamide composition.

4. The polyamide composition of claim 3 wherein the impact modifier is included in an amount of from about 5 wt % to about 20 wt %, based on the total weight of the polyamide composition.

5. The polyamide composition of claim 1 wherein the comonomer of said first polymer is a maleic acid monoester.

6. The polyamide composition of claim 1 wherein the polyamide is included in an amount of from about 60 wt % to about 98 wt % based on the total weight of the polyamide composition.

7. The polyamide composition of claim 1 wherein the polyamide is included in an amount of from about 70 wt % to about 98 wt %, based on the total weight of the polyamide composition.

8. The polyamide composition of claim 1 wherein the polyamide is included in an amount of from about 80 wt % to about 98 wt %, based on the total weight of the polyamide composition.

9. An article obtained from a polyamide composition wherein the polyamide composition comprises (1) from about 50 wt % to about 98 wt % of a polyamide resin, based on the total weight of the polyamide composition; and (2) from about 2 wt % to about 50 wt % of an impact modifier composition, based on the total weight of the polyamide composition, said impact modifier composition comprising (a) from about 10 wt % to about 50 wt % of a first polymer, based on the total weight of said modifier composition, wherein said first polymer is a copolymer prepared by high pressure free radical copolymerization comprising copolymerized units of ethylene and a comonomer selected from the group consisting of maleic acid monoesters, maleic acid diesters, fumaric acid monoesters, and mixtures thereof, and said first polymer comprises from about 3 wt % to about 15 wt % of said comonomer, and (b) from about 50 wt % to about 90 wt % of a second polymer, based on the total weight of the modifier composition, wherein said second polymer is selected from the group consisting of copolymers of ethylene and alpha-olefins prepared using metallocene catalysts, ethylene acrylic ester dipolymers, ethylene methacrylic ester dipolymers and mixtures thereof.

10. The article of claim 9 wherein the article is a component of a second article selected from the group consisting of household appliances; automobiles; tools; sports equipment; personal protective equipment; sports wear; and electronic equipment.

11. The polyamide composition of claim 1 wherein said first polymer is a terpolymer comprising copolymerized units of ethylene, a second comonomer selected from the group consisting of maleic acid monoesters, maleic acid diesters, fumaric acid monoesters, and a third comonomer selected from the group consisting of vinyl acetate, esters of acrylic acid and esters of methacrylic acid.

12. The polyamide composition of claim 11 wherein said third comonomer is selected from the group consisting of esters of acrylic acid and esters of methacrylic acid.

13. A toughened polyamide composition, comprising; (1) from about 50 wt % to about 98 wt % of a polyamide resin, based on the total weight of the polyamide composition, and (2) from about 2 wt % to about 50 wt % of an impact modifier composition, based on the total weight of the polyamide composition, said impact modifier composition comprising (a) from about 10 wt % to about 50 wt % of a first polymer, based on the total weight of said impact modifier composition, wherein said first polymer is a copolymer prepared by high pressure free radical copolymerization comprising copolymerized units of ethylene and a comonomer selected from the group consisting of maleic acid monoesters, maleic acid diesters, fumaric acid monoesters, and mixtures thereof, and wherein said first polymer comprises from about 3 wt % to about 15 wt % of said comonomer, and (b) from about 50 wt % to about 90 wt % of a second polymer, based on the total weight of said impact modifier composition, wherein said second polymer is selected from the group consisting of ethylene acrylic ester dipolymers, ethylene methacrylic ester dipolymers and mixtures thereof.

14. The polyamide composition of claim 13 wherein said second polymer is an ethylene acrylic ester dipolymer.

15. The polyamide composition of claim 13 wherein said second polymer is an ethylene methacrylic ester dipolymer.

* * * * *